(12) United States Patent
Worrall et al.

(10) Patent No.: US 9,502,851 B1
(45) Date of Patent: Nov. 22, 2016

(54) WAVEGUIDE AMPLIFICATION SWITCH

(71) Applicant: Xyratex Technology Limited, Havant (GB)

(72) Inventors: Alexander C. Worrall, Waterlooville (GB); Richard C. A. Pitwon, Fareham (GB)

(73) Assignee: Xyratex Technology Limited, Havant (GB)

( * ) Notice: Subject to any disclaimer, the term of this patent is extended or adjusted under 35 U.S.C. 154(b) by 0 days.

(21) Appl. No.: 14/700,179

(22) Filed: Apr. 30, 2015

(51) Int. Cl.
*H01S 3/00* (2006.01)
*H01S 3/063* (2006.01)
*H01S 3/091* (2006.01)

(52) U.S. Cl.
CPC ............ *H01S 3/0632* (2013.01); *H01S 3/091* (2013.01); *H01S 3/063* (2013.01)

(58) Field of Classification Search
CPC ....... H01S 3/063; H01S 3/0632; H01S 3/091
USPC ........................................ 359/342
See application file for complete search history.

(56) References Cited

U.S. PATENT DOCUMENTS

| 7,068,420 | B2 | 6/2006 | Tallone et al. | |
| 8,488,920 | B2 | 7/2013 | Pitwon | |
| 8,488,923 | B2 | 7/2013 | Na et al. | |
| 2002/0097948 | A1* | 7/2002 | Bendett | G02B 6/12007 385/14 |
| 2004/0062512 | A1* | 4/2004 | Pawlowski | G02B 6/12011 385/141 |
| 2006/0152797 | A1* | 7/2006 | Pun | H01S 3/0632 359/342 |
| 2013/0235450 | A1 | 9/2013 | Pitwon | |

OTHER PUBLICATIONS

Fujimoto, S. et al., "Near Infrared Light Amplification in Dye-Doped Polymer Waveguide," *Japanese Journal Applied Physics*, Apr. 2006, 45:L355-L357. Abstract retrieved from the Internet: <URL:http://iopscience.iop.org/1347-4065/45/4L/L355>; 2 pgs.
Moynihan, S. et al., "Optical properties of planar polymer waveguides doped with organolanthide complexes," *Science Direct Optical Materials*, 2007, 29:1821-1830. Published online Dec. 12, 2006.
Pitwon, Richard C.A. et al., "FirstLight: Pluggable Optical Interconnect Technologies for Polymeric Electro-Optical Printed Circuit Boards in Data Centers," *Journal of Lightwave Technology*, Nov. 1, 2012, 30(21):3316-3329.

* cited by examiner

*Primary Examiner* — Mark Hellner
(74) *Attorney, Agent, or Firm* — Mueting, Raasch & Gebhardt, P.A.

(57) ABSTRACT

An apparatus includes a polymer waveguide having a doped region, with amplifying dopant, separating a first un-doped region and a second un-doped region. The doped region being doped with an amplifying dopant. An optical pump source illuminates the doped region to allow light to transmit from the first un-doped region to the second un-doped region.

20 Claims, 4 Drawing Sheets

WAVEGUIDE AMPLIFICATION SWITCH

The disclosure herein relates to a waveguide amplification node to provide switching, mode conversion or multiplexing on optical printed circuit boards.

SUMMARY

The present disclosure relates to one or more polymer waveguides on a substrate where a waveguide amplification node provides switching, mode conversion, combining or multiplexing of the signal transmitting through the polymer waveguide.

In at least one embodiment, an apparatus includes a polymer waveguide having a doped region separating a first un-doped region and a second un-doped region. The doped region being doped with an amplifying dopant. An optical pump source to pump the doped region and allow light to transmit from the first un-doped region to the second un-doped region when the optical pump illuminates the doped region and to not allow light to transmit from the first un-doped region to the second un-doped region when the optical pump does not illuminate the doped region.

In another embodiment, an apparatus includes a polymer waveguide having a primary waveguide segment and a plurality of secondary waveguide segments branching from the primary waveguide segment. Each secondary waveguide segment includes a doped region separating a first un-doped region and a second un-doped region. Each doped region being doped with an amplifying dopant. One or more optical pump sources to pump one or more selected doped regions and allow light to transmit from the selected one or more first un-doped regions to the one or more selected second un-doped regions when the optical pump illuminates the one or more selected doped regions and to not allow light to transmit from the first un-doped region to the second un-doped region when the optical pump does not illuminate the doped region.

In a further embodiment, an apparatus includes a first polymer waveguide disposed on a substrate and having a primary waveguide segment and a plurality of first secondary waveguide segments branching from the primary waveguide segment. Each secondary waveguide segment includes a doped region separating a first un-doped region and a second un-doped region. Each doped region being doped with an amplifying dopant. A second polymer waveguide is disposed on the substrate and has a primary waveguide segment and a plurality of first secondary waveguide segments branching from the primary waveguide segment. Each secondary waveguide segment includes a doped region separating a first un-doped region and a second un-doped region. Each doped region being doped with an amplifying dopant. One or more optical pump sources pump one or more selected doped regions and allow light to transmit from the selected one or more first un-doped regions to the one or more selected second un-doped regions when the optical pump illuminates the one or more selected doped regions and does not allow light to transmit from the first un-doped region to the second un-doped region when the optical pump does not illuminate the doped region.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
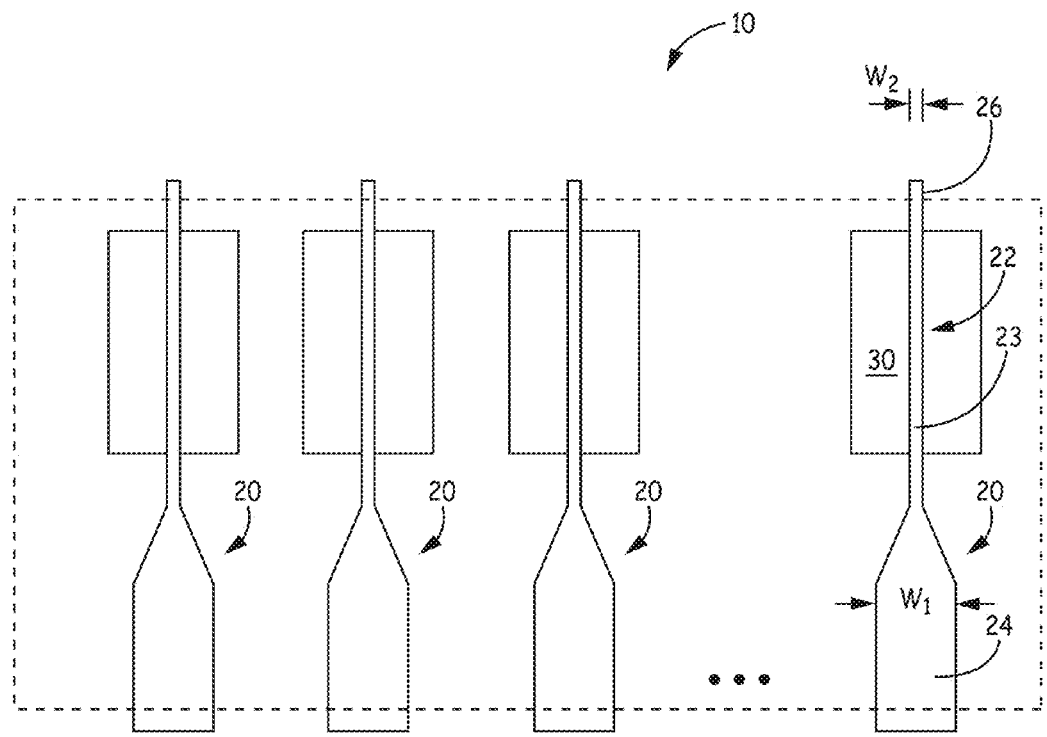
FIG. 1 is a schematic diagram of an exemplary waveguide mode conversion apparatus.

Polymer based optical waveguides provide numerous desirable properties for use in a multitude of electronic devices, including in some embodiments, data storage devices, network components, network appliances, routers, hubs and other similar devices. These waveguides can be formed on printed circuit boards (PCB) which in turn would be referred to as optical PCBs. These waveguides and optical PCBs can function as a component or building block of a larger structure or apparatus. Alternatively the waveguides and optical PCBs can function on their own without any other related devices or structures. The waveguides and optical PCBs can be integrated and connected to other structures and different components as well as in order to provide an assembly.

The present disclosure relates to one or more polymer waveguides on a substrate where a waveguide amplification node provides one or more of switching, mode conversion, combining, or multiplexing of the signal transmitting through the polymer waveguide. The waveguide amplification node includes an "active" or "doped" waveguide segment which upon exposure to pump radiation, amplifies signals propagating along the waveguide segment. A width of the waveguide is reduced upstream of the "active" or "doped" waveguide segment such that light is not able to transmit through the "active" or "doped" waveguide segment without the exposure to pump radiation. The reduction in width and corresponding cross-sectional area of the polymer waveguide (even assuming a substantially constant height of polymer waveguide) reduce the number of propagating modes in the waveguide, converting it from a multi-mode to a lesser mode (such as singlemode, for example) waveguide. Without amplification, this width reduction results in large optical losses and substantially prevents light from transmitting through the active" or "doped" waveguide segment. Waveguide amplification nodes described herein enables the practical operation of: waveguide mode converters; optical low-speed amplitude modulation for out-of-band, in-data-path signaling schemes which do not interfere with simultaneous high speed signals; integrated waveguide switches and broadcasters; and integrated waveguide wavelength division multiplexers. While the present disclosure is not so limited, an appreciation of various aspects of the disclosure will be gained through a discussion of the embodiments provided below.

It is to be understood that the waveguide configurations described herein are merely exemplary, and other waveguide configurations having additional or fewer waveguides in any similar (e.g., equivalent) arrangement are considered by the present disclosure. While the present disclosure is not so limited, an appreciation of various aspects of the disclosure will be gained through a discussion provided below.

Exemplary apparatus shall be described with reference to FIGS. 1-5. It will be apparent to one skilled in the art that elements from one embodiment may be used in combination with elements of the other embodiments, and that the possible embodiments of such apparatus or and device using combinations of features set forth herein is not limited to the specific embodiments shown in the figures and/or described herein. Further, it will be recognized that the size and shape of various elements herein may be modified but still fall within the scope of the present disclosure, although one or more shapes and/or sizes, or types of elements, may be advantageous over others.

Optical fiber amplifiers have been used with silica fibers to allow long distance transmission of optical signals without intermediary opto-electronic and electro-optic conversion. This is achieved by doping the fibers with lanthanides, such as neodymium and praseodymium, which have emission bands around 1300 nm and erbium which has an emission band around 1550 nm, in certain segments of the fiber known as active regions. The presence of lanthanides allows the active region to be optically excited or "pumped" to generate a population inversion in its electron states i.e. a higher proportion of dopant atoms or molecules are in an excited state than in their normal lower energy state, which satisfies the condition for stimulated emission whereby an incoming signal photon interacts with the excited atom and the latter's excited electron falls to a lower energy state while emitting a photon with the same energy (wavelength) and phase and in the same direction as the original photon. This gives rise to an amplification of incoming optical signals through the active region and is the dominant mechanism on which laser operation is based, except that lasers have optical resonating cavities where light is contained within the active region by mirrors, one of which is only partially reflecting, thus enabling the light intensity to build up to a steady state within the cavity, a small proportion of which (the laser beam) will escape through the partially reflecting mirror along a controlled trajectory.

A disadvantage of silica is that the achievable concentration of dopants in the silica matrix is low (0.1 mol %). Higher doping concentrations give rise to what is known as rare earth ion clustering, which has a detrimental effect on the photoluminescence (ability of substance to absorb and subsequently reemit a photon). Therefore active regions in silica fibers are very long in order to provide effective amplification.

Polymer on the other hand lends itself to much higher doping concentrations and therefore the active regions can be significantly shorter to enable practical deployment on an optical PCB. Any useful polymeric material can be utilized. In many embodiments the polymer waveguide is formed of a polyacrylate or polysiloxane material.

Some polymer doping schemes enable optical amplification by polymer waveguides include utilizing organo-lanthanide complexes and dyes. The lanthanide ions $Tb^{3+}$ (Terbium, pump wavelength 368 nm to emit 545 nm), $Dy^{3+}$ (Dysprosium, pump wavelength 365 nm to emit 573 nm), $Eu^{3+}$ (Europium, pump wavelength 395 nm to emit 613 nm) and $Sm^{3+}$ (Samarium, pump wavelength 402 nm to emit 643 nm) fluoresce in the wavelength band of 550 nm-650 nm, which is close to a polymer transmission window of 850 nm. Appropriate complexes of these lanthanides can be devised which push the fluorescence band into the polymer transmission window. In some embodiments the transmission window includes longer wavelengths (such as 1310 nm or 1550 nm for erbium $Er^{3+}$), in which polymer is more lossy (larger light loss) when not being pumped.

Polymer waveguides doped with organo-lanthanide dopants can demonstrate optical fluorescence in the visible and near-infrared required for amplification. Polymer waveguides can be doped with dyes which exhibit amplified spontaneous emission between 825 nm and 870 nm which bounds conventional short reach optical data communication wavelength of 850 nm.

Waveguide amplification nodes are disclosed in U.S. Pat. No. 8,488,920 and US 2013/0235450 which are incorporated by reference herein. Any light source emitting pump wavelength light, with sufficient optical power and intensity, can be an optical pump. In many embodiments the light pump is a solid state light source such as one or more light emitting diodes, or laser diodes. In many embodiments, the optical pump directs light orthogonally to the plane of the waveguide amplification node. In many embodiments, light emitting diodes are used as optical pumps and can emit pump light from 350 to 410 nm.

FIG. 1 is a schematic diagram of an exemplary waveguide mode conversion apparatus 10. While four polymer waveguides 20 are illustrated, it is understood that the apparatus 10 can have more or fewer polymer waveguides 20. The apparatus 10 includes a polymer waveguide 20 having a doped region 22 separating a first un-doped region 24 and a second un-doped region 26. The doped region 22 being doped with an amplifying dopant 23. An optical pump source 30 to pump the doped region 22 and allow light to transmit from the first un-doped region 24 to the second un-doped region 26 when the optical pump 30 illuminates the doped region 22 and to not allow light to transmit from the first un-doped region 24 to the second un-doped region 26 when the optical pump 30 does not illuminate the doped region 22.

The first un-doped region 24 has a first height and a first width $W_1$ and a second un-doped region 26 has a second height and a second width $W_2$ and the second width $W_2$ is less than the first width $W_1$ and the doped region has the second width $W_2$. In many embodiments, the second width $W_2$ is 50% or less or 25% or less the first width $W_1$. For example, the first width $W_1$ can be in a range from 40 to 60 micrometers and the second width $W_2$ can be in a range from 1 to 10 micrometers or from 4 to 6 micrometers to go from multimode to fewer mode waveguides, or assuming the height is in the range of 4 to 6 micrometers, singlemode waveguides. In many embodiments the first height and the second height are a similar value. Thus, the first un-doped region 24 can transmit a multimode signal and the second un-doped region 26 transmits a proportion less than 1 of the modes transmitted in the multimode signal in the first un-doped region. In many embodiments, the first un-doped region 24 transmits a multimode signal and the second un-doped region 26 transmits a singlemode signal.

Without amplification, such a width reduction gives rise to a very large optical transition loss due to the change in numerical aperature (NA) and size, whereby most of the light in the waveguide is lost and leaks out into the cladding of the polymer waveguide. For example, about 90%-95% of the light propagating through a typical multimode waveguide would be lost in the transition to a singlemode waveguide. Furthermore, the amplifying dopants in the doped waveguide region, when not being pumped, make them very lossy or inefficient. Therefore, in the absence of pumping or energizing of the amplifying dopants in the doped waveguide region almost all the light entering the amplification node is lost upon exiting the amplification node. In many embodiments, the doped waveguide region 22 or second un-doped waveguide region 26 waveguide region can include a curved segment that further enhances losses (when not being pumped).

Given the large optical losses described above by non-energized doped waveguides, these would effectively be in an "off" state. Amplification nodes allow the user to switch optical channels on and off Depending on the amplification mechanism and the time it takes to start and stop a stable gain state, this could also be used for (at least low speed) amplitude modulation of the (already high speed modulated) optical signal, which could provide the basis for an out-of-band (in-data-path) signaling scheme.

Figure 2:
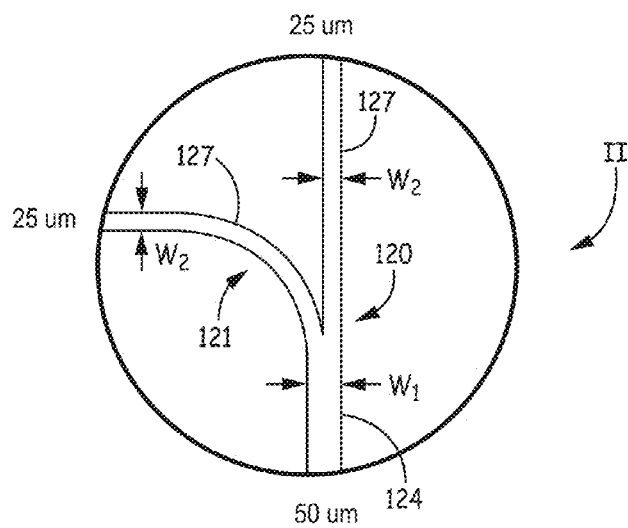
FIG. 2 is a schematic diagram top view of an illustrative 1-2 waveguide splitter section.

A useful implementation of the on/off amplification node is to combine it with splitter structures in order to create integrated optical waveguide crossbar switches for both switching and broadcasting. Specifically a waveguide is split into 2 or more branches such that the width of the original waveguide is substantially equal to the sum of widths of all its tributary waveguides as shown in FIG. 2. A portion of the optical signal traveling through the primary or "root" waveguide is split into the tributaries, the splitting proportion being determined by the respective properties of the splitter junction, root and tributary waveguides.

Figure 3:
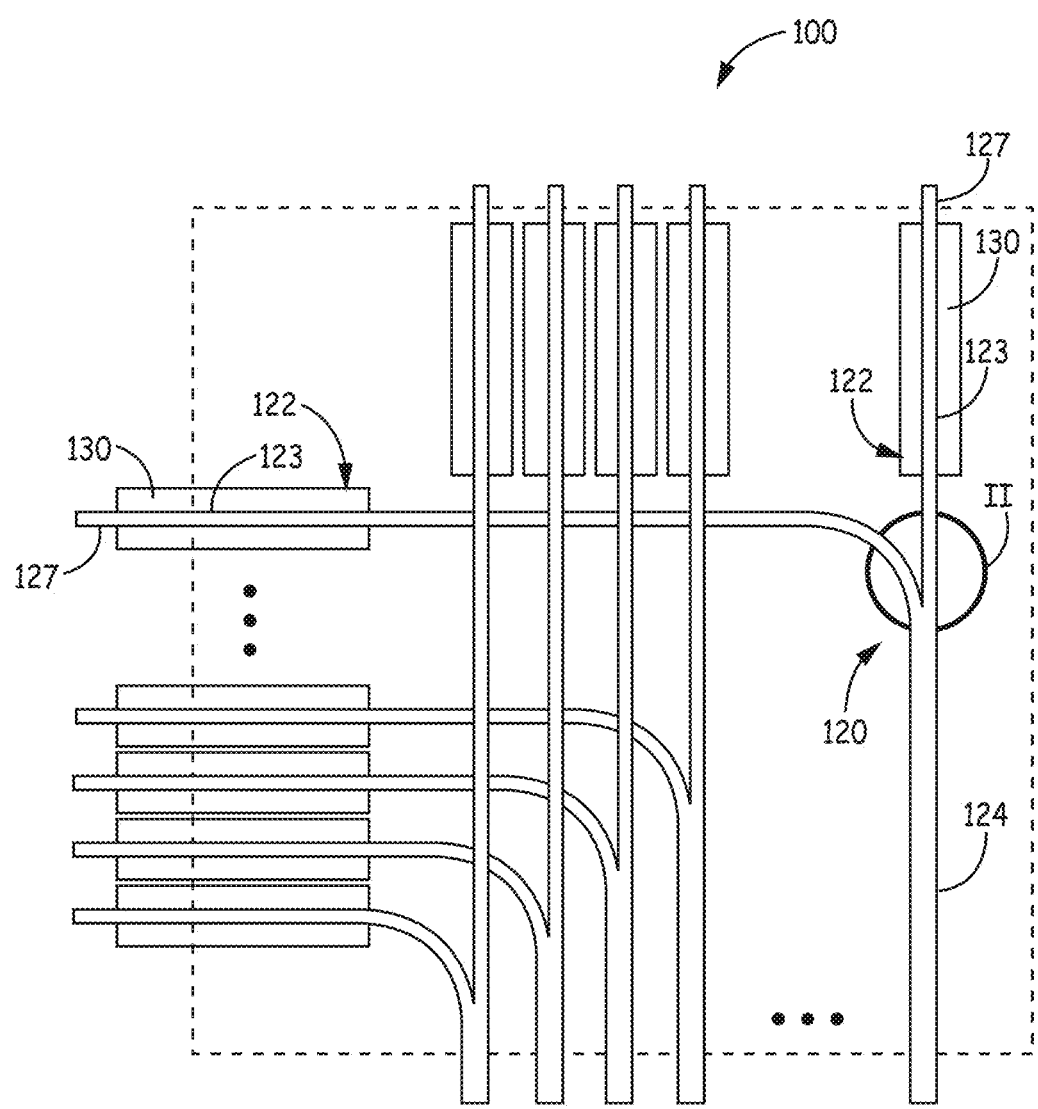
FIG. 3 is a schematic diagram of an exemplary crossbar waveguide switch with 1-2 switching and broadcasting function.
Figure 4:
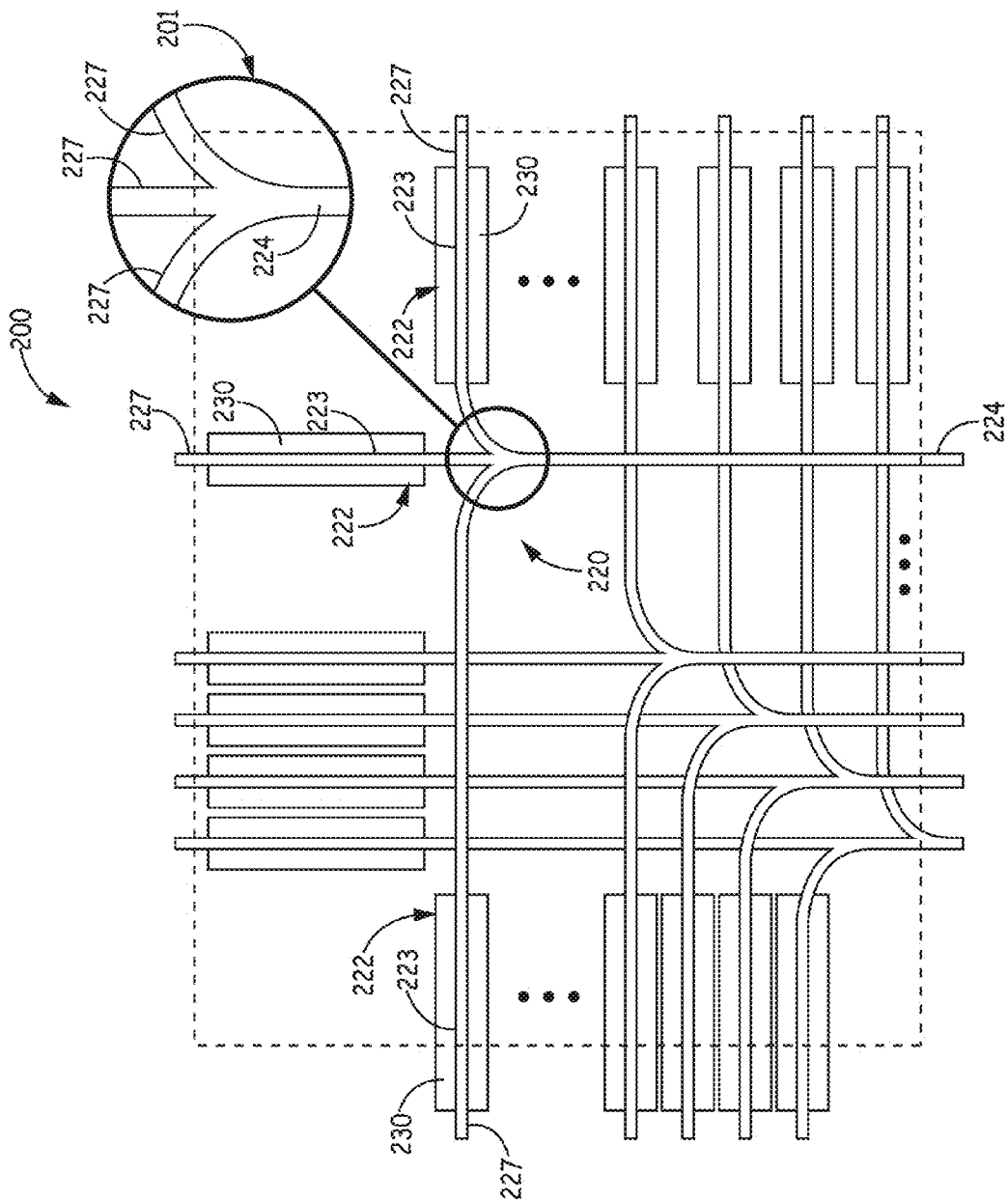
FIG. 4 is a schematic diagram of an exemplary crossbar waveguide switch with 1-3 switching and broadcasting function.

FIG. 2 is a schematic diagram top view of an illustrative 1-2 waveguide splitter section 120. FIG. 3 is a schematic diagram of an exemplary crossbar waveguide switch 100 with 1-2 switching and broadcasting function. FIG. 4 is a schematic diagram of an exemplary crossbar waveguide switch 200 with 1-3 switching and broadcasting function. While five polymer waveguides 120, 220 are illustrated, it is understood that the apparatus 100, 200 can have more or fewer polymer waveguides 120, 220.

The apparatus 100, 200 includes a polymer waveguide 120, 220 having a primary waveguide segment 124, 224 and a plurality of secondary waveguide segments 127, 227 branching from the primary waveguide segment 124, 224. Each secondary waveguide segment 127, 227 includes a doped region 122, 222 separating a first un-doped region 124, 224 and a second un-doped region 127, 227. Each doped region 122, 222 being doped with an amplifying dopant 123, 223.

One or more optical pump sources 130, 230 pump one or more selected doped regions 122, 222 and allow light to transmit from the selected one or more first un-doped regions 124, 224 to the one or more selected second un-doped regions 127, 227 when the optical pump 130, 230 illuminates the one or more selected doped regions 122, 222 and to not allow light to transmit from the first un-doped region 124, 224 to the second un-doped region 127, 227 when the optical pump 130, 230 does not illuminate the doped region 122, 222.

The primary waveguide segment 124, 224 has a first height and a first width $W_1$ and each secondary waveguide segments 127, 227 has a second height and a second width $W_2$ and the second width $W_2$ is less than the first width $W_1$. In many embodiments, the second width $W_2$ is 50% or less or 25% or less the first width $W_1$. In many embodiments, the first width $W_1$ and the total width value of the second widths $W_2$ is substantially equal to the first width $W_1$. As illustrated in FIG. 2, the first width $W_1$ is about 50 micrometers and the total width value of the second widths $W_2$ (25 micrometers times two) is substantially equal to the first width $W_1$, for example. As illustrated in FIG. 4, the first width is about three times the width value each of the three second widths.

In some embodiments the second widths $W_2$ may be different from one another, in order to better accommodate the different circuit geometries to which they are connected. For instance if a tributary waveguide is connected to a longer or more lossy overall waveguide geometry (either through length and/or number of bends etc), it may be beneficial to increase the proportion of light travelling along that tributary waveguide compared to one or more other tributary waveguides connected to less lossy overall geometries.

In many embodiments the first height and the second height are a similar value. Thus, the primary waveguide segment 124, 224 can transmit a multimode signal and each secondary waveguide segment 127, 227 transmits less modes than in the primary multimode signal. In many embodiments, the primary waveguide segment 124, 224 transmits a multimode signal and the secondary waveguide segment 127, 227 transmits a single mode signal.

FIG. 3 illustrates two secondary waveguide segments 127 branching off from the primary waveguide segment 124. Here if all amplification areas are turned on then the crossbar waveguide switch 100 acts like a 1-2 broadcaster. FIG. 4 illustrates three secondary waveguide segments 227 branching off from the primary waveguide segment 224. Here if all amplification areas are turned on then the crossbar waveguide switch 200 acts like a 1-3 broadcaster. In other embodiments the polymer waveguide has four or more secondary waveguide segments branching off from the primary waveguide segment. As illustrated in FIG. 2, FIG. 3, and FIG. 4, one or more of the secondary waveguide segments 127, 227 are curved segments.

Figure 5:
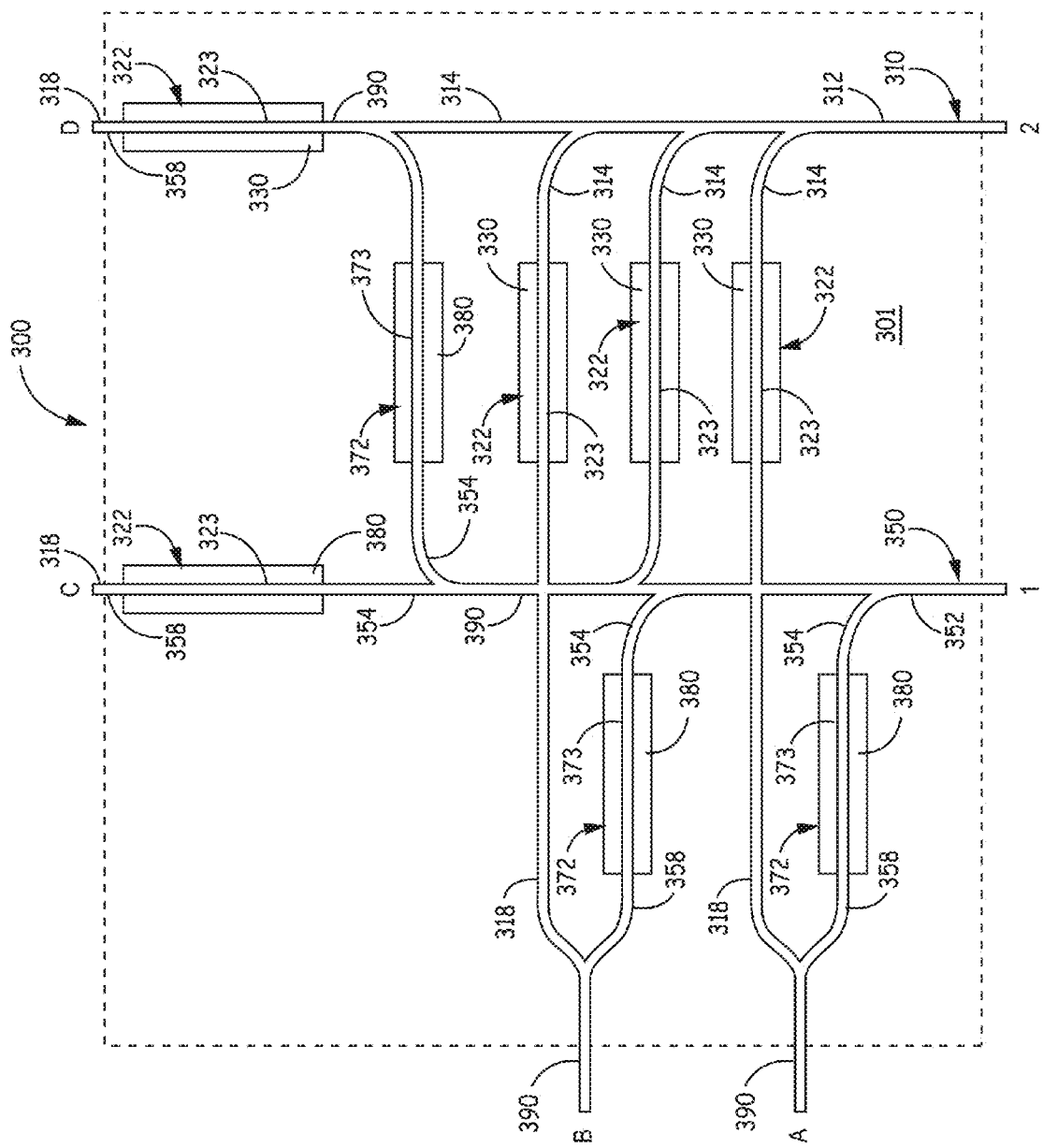
FIG. 5 is a schematic diagram of an exemplary 2×4 crossbar switch where either or both inputs can be directed to one or more of four outputs.

FIG. 5 is a schematic diagram of an exemplary 2×4 crossbar switch 300 where either or both inputs 1, 2 can be directed to one or more of four outputs A, B, C, D. While two polymer waveguides 310, 350 are illustrated, it is understood that the apparatus 300 can have more or fewer polymer waveguides 310, 350.

The apparatus 300 includes a first polymer waveguide 310 disposed on a substrate 301 and having a primary waveguide segment 312 and a plurality of first secondary waveguide segments 314 branching from the primary waveguide segment 312. Each secondary waveguide segment 314 includes a doped region 322 separating a first un-doped region 312 and a second un-doped region 318. Each doped region 322 is doped with an amplifying dopant 323.

A second polymer waveguide 350 is disposed on the substrate 301 and having a primary waveguide segment 352 and a plurality of second secondary waveguide segments 354 branching from the primary waveguide segment 352. Each secondary waveguide segment 354 includes a doped region 372 separating a first un-doped region 352 and a second un-doped region 358. Each doped region 372 is doped with an amplifying dopant 373.

One or more optical pump sources 330, 380 pump one or more selected doped regions 322, 372 and allow light to transmit from the selected one or more first un-doped regions 312, 352 to the one or more selected second un-doped regions 318, 358 when the optical pump 330, 380 illuminates the one or more selected doped regions 322, 372 and to not allow light to transmit from the first un-doped region 312, 352 to the second un-doped region 318, 358 when the optical pump 330, 380 does not illuminate the doped region 322, 372.

The primary waveguide segment 312, 352 has a first height and a first width and each secondary waveguide segment 314, 354 has a second height and a second width and the second width is less than the first width. In many embodiments, the second width is 50% or less or 25% or less than the first width. In many embodiments, the first width and the total width value of the second widths is substantially equal.

In many embodiments the first height and the second height are a similar value. Thus, the primary waveguide segment 312, 352 can transmit a multimode signal and each secondary waveguide segment 314, 354 transmits less modes than in the primary multimode signal. In some embodiments, the primary waveguide segment 312, 352 transmits a multimode signal and the secondary waveguide segment 314, 354 transmits a singlemode signal (with the appropriate reduction in waveguide cross-sectional area). As illustrated in FIG. 5 one or more of the secondary waveguide segments 314, 354 are curved segments.

In some embodiments the second height can be reduced through selective waveguide fabrication processes to ensure complete conversion from a fully multimode waveguide (typically 50 μm×50 μm) to a singlemode waveguide (typically 7 μm×7 μm). An example of such a selective fabrication process would be direct polymer deposition through a nozzle moving across the substrate, in which waveguide geometry can be varied by varying parameters of the deposition procedure such as translation speed, nozzle size, polymer nozzle pressure.

In many embodiments, one of the secondary waveguide segments 318 of the first polymer waveguide 310 joins one secondary waveguide segment 358 of the second polymer waveguide 350 to form a single combined waveguide 390 downstream from at least one doped region 372, 322 of either the first polymer waveguide secondary waveguide segment 314 or the second polymer waveguide secondary waveguide segment 354.

In some embodiments, two or more waveguide segments combine to from a single waveguide segment. This can be described as a "wavelength division multiplexer" where two or more waveguide segments that may each propagate different signals combine, thus multiplexing them. These signals can simply be combined (combiner) or separated downstream by a process or differentiating characteristic of the different signals (multiplexer).

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above, "below", etc. may be used in this disclosure. These terms should not be construed as limiting the position or orientation of a structure, but should be used as providing spatial relationship between the structures.

Embodiments of the apparatus including the waveguide amplification node to provide switching, mode conversion or multiplexing on optical printed circuit boards are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An apparatus comprising:
   a polymer waveguide having a doped region separating a first un-doped region and a second un-doped region, the doped region being doped with an amplifying dopant, the first un-doped region having a first height and a first width and a second un-doped region having a second height and a second width, the second width being less than the first width; and
   an optical pump source to pump the doped region and allow light to transmit from the first un-doped region to the second un-doped region when the optical pump illuminates the doped region and to not allow light to transmit from the first un-doped region to the second un-doped region when the optical pump does not illuminate the doped region.

2. The apparatus of claim 1, wherein the doped region has the second width.

3. The apparatus of claim 1, wherein the second width is 50% or less the first width.

4. The apparatus of claim 1, wherein the second width is 25% or less the first width.

5. The apparatus of claim 1, wherein the first un-doped region transmits a multimode signal and the second un-doped region transmits a less than the multimode signal.

6. The apparatus of claim 1, wherein the doped or second un-doped waveguide region comprises a curved segment.

7. An apparatus comprising:
   a polymer waveguide having a primary waveguide segment and a plurality of secondary waveguide segments branching from the primary waveguide segment, each secondary waveguide segment comprises a doped region separating a first un-doped region and a second un-doped region, each doped region being doped with an amplifying dopant; and
   one or more optical pump sources to pump one or more selected doped regions and allow light to transmit from the selected one or more first un-doped regions to the one or more selected second un-doped regions when the optical pump illuminates the one or more selected doped regions and to not allow light to transmit from the first un-doped region to the second un-doped region when the optical pump does not illuminate the doped region.

8. The apparatus of claim 7, wherein the primary waveguide segment has a first height and a first width and each secondary waveguide segments has a second height and a second width and the second width is less than the first width.

9. The apparatus of claim 8, wherein the primary waveguide segment has a first height and a first width and each secondary waveguide segments has a second height and a second width and total width value of the second widths is substantially equal to the first width.

10. The apparatus of claim 8, wherein each second width is 50% or less the first width.

11. The apparatus of claim 7, wherein the polymer waveguide comprises two or more secondary waveguide segments branching from the primary waveguide segment.

12. The apparatus of claim 7, wherein the polymer waveguide comprises three or more secondary waveguide segments branching from the primary waveguide segment.

13. The apparatus of claim 7, wherein at least selected secondary waveguide segments comprise a curved segment.

14. An apparatus comprising:
a first polymer waveguide disposed on a substrate and having a primary waveguide segment and a plurality of first secondary waveguide segments branching from the primary waveguide segment, each secondary waveguide segment comprises a doped region separating a first un-doped region and a second un-doped region, each doped region being doped with an amplifying dopant;
a second polymer waveguide disposed on the substrate and having a primary waveguide segment and a plurality of first secondary waveguide segments branching from the primary waveguide segment, each secondary waveguide segment comprises a doped region separating a first un-doped region and a second un-doped region, each doped region being doped with an amplifying dopant; and
one or more optical pump sources to pump one or more selected doped regions and allow light to transmit from the selected one or more first un-doped regions to the one or more selected second un-doped regions when the optical pump illuminates the one or more selected doped regions and to not allow light to transmit from the first un-doped region to the second un-doped region when the optical pump does not illuminate the doped region.

15. The apparatus of claim 14, wherein the first polymer waveguide primary waveguide segment has a first height and a first width and each secondary waveguide segment of the first polymer waveguide has a second height and a second width and the second width is less than the first width and the second polymer waveguide primary waveguide segment has a first height and a first width and each secondary waveguide segment of the second polymer waveguide has a second height and a second width and the second width is less than the first width.

16. The apparatus of claim 15, wherein the first polymer waveguide primary waveguide segment has a first height and a first width and each secondary waveguide segments of the first polymer waveguide has a second height and a second width and the total width value of the second widths is substantially equal to the first width.

17. The apparatus of claim 14, wherein the first polymer waveguide comprises two or more secondary waveguide segments branching from the primary waveguide segment and at least one secondary waveguide segment comprises a curved segment.

18. The apparatus of claim 17, wherein the second polymer waveguide comprises two or more secondary waveguide segments branching from the primary waveguide segment and at least one secondary waveguide segment comprises a curved segment.

19. The apparatus of claim 14, wherein one of the secondary waveguide segments of the first polymer waveguide joins one secondary waveguide segments of the second polymer waveguide to form a single combined waveguide downstream from at least one doped region of either the first polymer waveguide secondary waveguide segment or the second polymer waveguide secondary waveguide segment.

20. The apparatus of claim 14, wherein one of the secondary waveguide segments of the first polymer waveguide joins one secondary waveguide segments of the second polymer waveguide to form a single combined waveguide downstream from the doped region of the first polymer waveguide secondary waveguide segment and the doped region of the second polymer waveguide secondary waveguide segment.

* * * * *